United States Patent
Yoon

(10) Patent No.: US 8,330,904 B2
(45) Date of Patent: Dec. 11, 2012

(54) COLOR FILTER USING SURFACE PLASMON, LIQUID CRYSTAL DISPLAY DEVICE AND METHOD FOR FABRICATING THE SAME

(75) Inventor: Min-Sung Yoon, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 188 days.

(21) Appl. No.: 12/886,317

(22) Filed: Sep. 20, 2010

(65) Prior Publication Data

US 2011/0149214 A1 Jun. 23, 2011

(30) Foreign Application Priority Data

Dec. 18, 2009 (KR) .................. 10-2009-0127430

(51) Int. Cl.
*G02F 1/1335* (2006.01)
(52) U.S. Cl. ........................................ 349/106; 349/107
(58) Field of Classification Search ................. 349/106, 349/107
See application file for complete search history.

(56) References Cited

U.S. PATENT DOCUMENTS

| | | | |
|---|---|---|---|
| 5,451,980 A | 9/1995 | Simon et al. | |
| 5,570,139 A | 10/1996 | Wang | |
| 5,973,316 A | 10/1999 | Ebbesen et al. | |
| 5,986,808 A | 11/1999 | Wang | |
| 5,991,000 A | 11/1999 | Shimabukuro et al. | |
| 6,040,936 A | 3/2000 | Kim et al. | |
| 6,097,456 A | 8/2000 | Wang | |
| 6,122,091 A | 9/2000 | Russell et al. | |
| 6,236,033 B1 | 5/2001 | Ebbesen et al. | |
| 6,285,020 B1 | 9/2001 | Kim et al. | |
| 6,441,298 B1 | 8/2002 | Thio | |
| 6,992,826 B2 | 1/2006 | Wang | |
| 7,085,220 B2 | 8/2006 | Fujikata et al. | |
| 7,110,154 B2 | 9/2006 | Ballato et al. | |
| 7,206,114 B2 | 4/2007 | Ballato et al. | |
| 7,248,297 B2 | 7/2007 | Catrysse et al. | |
| 7,417,219 B2 | 8/2008 | Catrysse et al. | |
| 7,420,156 B2 | 9/2008 | Kim et al. | |
| 8,045,107 B2 * | 10/2011 | Tang et al. | 349/117 |
| 2006/0284829 A1 | 12/2006 | Moriyama et al. | |
| 2009/0027329 A1 | 1/2009 | Choi et al. | |
| 2009/0034055 A1 | 2/2009 | Gibson | |
| 2009/0087793 A1 | 4/2009 | Kim et al. | |
| 2009/0091644 A1 | 4/2009 | Mackey | |

FOREIGN PATENT DOCUMENTS

CN 101592751 A 12/2009
WO WO 02/42836 A1 5/2002

OTHER PUBLICATIONS

English Translation of Abstract of KR10-2008-0003086A.
English Translation of Abstract of KR10-2009-0113516A.
Inoue et al., RGB Color Filter Compr4ising Aluminum Film with Surface Plasmon Enhanced Transmission through Sub-Wavelength Hole-Arrays, Optical MEMS and Nanophotonics, 2009 IEEE/LEOS International Conference on Aug. 2009, pp. 150-151.

* cited by examiner

*Primary Examiner* — Phu Vu
(74) *Attorney, Agent, or Firm* — Birch, Stewart, Kolasch & Birch, LLP

(57) ABSTRACT

A color filter using a surface plasmon includes a metal layer; and a transmissive pattern formed in the metal layer, the transmissive pattern comprising a plurality of sub-wavelength holes having a period, wherein a desired color of light is output by selectively transmitting light of a specific wavelength by using the surface plasmon, and the plurality of sub-wavelength holes are arranged in a triangular lattice having a predetermined number of nearest neighboring holes with respect to a central hole.

39 Claims, 16 Drawing Sheets

UNIT CELL

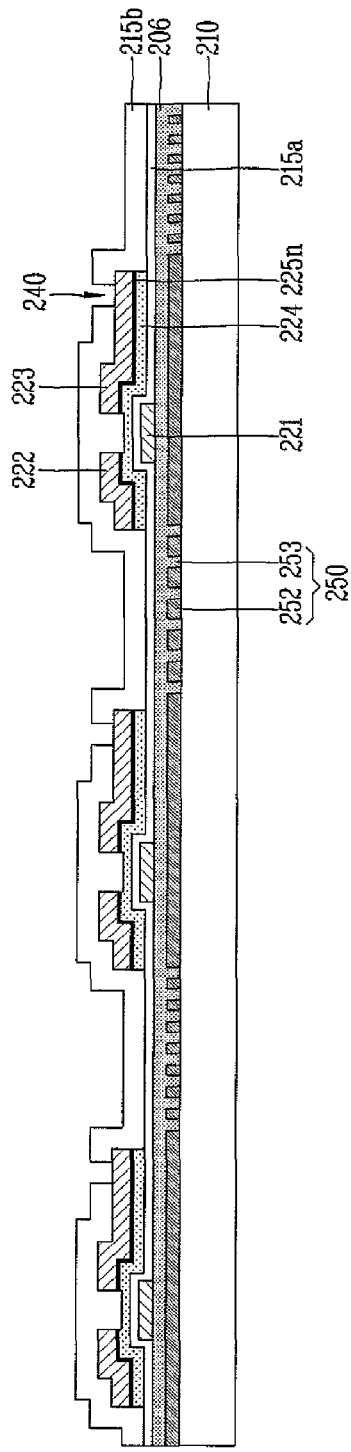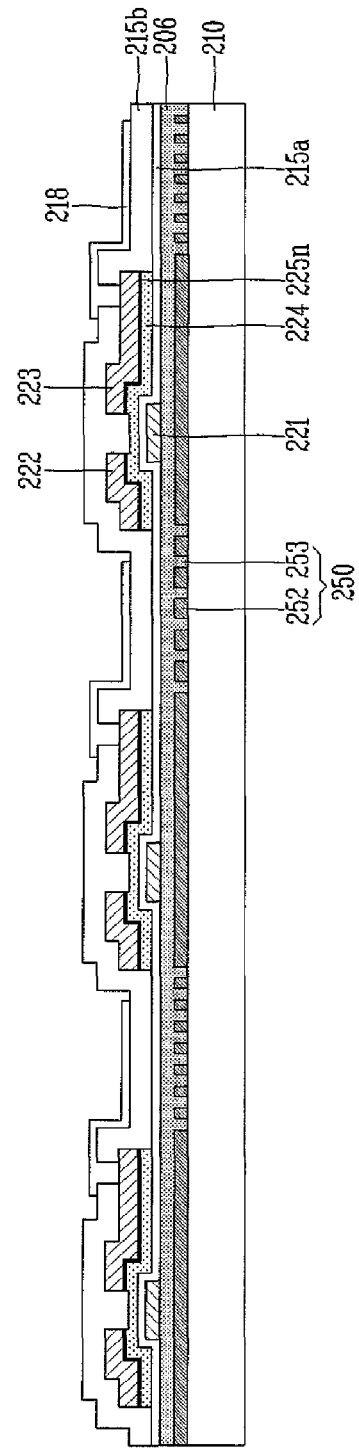

COLOR FILTER USING SURFACE PLASMON, LIQUID CRYSTAL DISPLAY DEVICE AND METHOD FOR FABRICATING THE SAME

CROSS-REFERENCE TO RELATED APPLICATION

Pursuant to 35 U.S.C. §119(a), this application claims the benefit of and priority to Korean Application 10-2009-0127430, filed on Dec. 18, 2009, the content of which is incorporated herein by reference.

BACKGROUND OF THE INVENTION

1. Field of the Invention

Embodiments of the present invention relate to a color filter using a surface plasmon, a liquid crystal display (LCD) device, and a method for fabricating the same, and more particularly, to a color filter using a surface plasmon and having a three-dimensional (3D) pattern structure provided with a transmissive pattern for selectively transmitting light of a specific wavelength, an LCD device, and a method for fabricating the same.

2. Discussion of the Related Art

As concerns about information displays and demands for portable information media increases, research and commercialization of flat panel displays (FPD) to replace the related art display apparatus, Cathode Ray Tubes (CRT), are actively ongoing. One of these flat panel displays, a Liquid Crystal Display (LCD) device serves to display an image by using optical anisotropy of a liquid crystal (LC). Owing to excellent resolution, color reproduction characteristic, and picture quality, the LCD device is being actively applied to notebooks, desk top monitors, etc.

The LCD device is largely comprised of a color filter substrate, an array substrate, and an LC layer interposed between the color filter substrate and the array substrate.

The LCD device is fabricated through a plural number of mask processes (i.e., photo lithography process). Accordingly, required is a method for reducing the number of mask processes for enhanced productivity.

Hereinafter, a structure of the related art LCD device will be explained in more detail with reference to FIG. 1.

FIG. 1 is a perspective view schematically showing a related art LCD. As shown in FIG. 1, the LCD device largely comprises a color filter substrate 5, an array substrate 10, and an LC layer 30 interposed between the color filter substrate 5 and the array substrate 10.

The color filter substrate 5 consists of a color filter (C) composed of a plurality of sub color filters 7 for implementing red, green and blue (RGB) colors, a black matrix 6 for dividing the sub color filters 7 from each other and shielding light passing through the LC layer 30, and a transparent common electrode 8 for applying a voltage to the LC layer 30.

The array substrate 10 consists of a plurality of gate lines 16 and data lines 17 arranged in horizontal and vertical directions to define a plurality of pixel regions (P), Thin Film Transistors (TFT) as switching devices formed at intersections between the gate lines 16 and the data lines 17, and pixel electrodes 18 formed in the pixel regions (P).

The color filter substrate 5 and the array substrate 10 facing each other are bonded to each other by a sealant formed on an outer periphery of an image display region, thereby constituting an LC panel. The color filter substrate 5 and the array substrate 10 are bonded to each other by alignment keys formed at the color filter substrate 5 or the array substrate 10.

In order to prevent or reduce light leakage due to an alignment error when bonding the two substrates to each other, a line width of the black matrix is set to be wide, thereby obtaining an alignment margin. This may reduce an aperture ratio of the LC panel.

The conventional color filter used in the LCD device implements colors by absorbing light of unnecessary colors by using pigments or dyes, and by selectively transmitting light of desired colors. This may allow only one of RGB colors, source from white incident light, to be transmitted to one sub-pixel. Accordingly, it is difficult to have a transmittance ratio of more than 30%. Due to this low transmittance ratio of the LC panel, power consumption by a backlight is increased.

FIG. 2 is a view schematically showing a transmittance ratio of the LC panel when applying a color filter using a conventional pigment dispersing method. Referring to FIG. 2, as light incident from a backlight has a decreased optical amount decreased while sequentially passing through a polarizer, a TFT array, an LC and a color filter, a transmittance ratio thereof is reduced to 5% or less.

In this instance, the polarizer, the TFT array and the color filter approximately have transmittance ratios of ~40%, 45~55% and ~25%, respectively.

The conventional color filter is fabricated with complicated processes since it repeatedly undergoes color resist coating, exposure to light, development and hardening processes according to each color.

Furthermore, in order to fabricate the color filter on the color filter substrate, production lines for color filter processing have to be implemented separately from production lines for TFT processing. This may increase line installation costs.

SUMMARY OF THE INVENTION

Therefore, an object of the present invention is to provide a color filter using a surface plasmon capable of enhancing an aperture ratio and a transmittance ratio of an LC panel, by using a surface plasmon instead of using the conventional dyes or pigments, a liquid crystal display (LCD) device, and a method for fabricating the same.

Another object of the present invention is to provide a color filter using a surface plasmon capable of enhancing an aperture ratio by changing a hole arrangement of a transmissive pattern, a liquid crystal display (LCD) device, and a method for fabricating the same.

Still another object of the present invention is to provide a liquid crystal display (LCD) device capable of simplifying processes by using the color filter as a common electrode or a back electrode, or by forming a switching device on a lower array substrate, and capable of reducing installation costs.

According to an embodiment of the invention, a color filter using a surface plasmon includes a metal layer; and a transmissive pattern formed in the metal layer, the transmissive pattern comprising a plurality of sub-wavelength holes having a period, wherein a desired color of light is output by selectively transmitting light of a specific wavelength by using the surface plasmon, and the plurality of sub-wavelength holes are arranged in a triangular lattice having a predetermined number of nearest neighboring holes with respect to a central hole.

According to an embodiment of the invention, a liquid crystal display (LCD) device includes a first substrate; a second substrate; a thin film transistor (TFT) formed on the first substrate, the TFT including a gate electrode, a semiconductor layer, a source electrode, and a drain electrode; a pixel electrode connected to the drain electrode on the first substrate; a common electrode formed on one of the first substrate and the second substrate; and a color filter formed on one of the first substrate and the second substrate, and having a transmissive pattern formed in a metal layer, the transmissive pattern comprising a plurality of sub-wavelength holes having a period, wherein a desired color of light is output by selectively transmitting light of a specific wavelength by using a surface plasmon, and the plurality of sub-wavelength holes are arranged in a triangular lattice having a predetermined number of nearest neighboring holes with respect to a central hole.

According to an embodiment of the invention, a liquid crystal display (LCD) device includes a first substrate; a second substrate; a thin film transistor (TFT) formed on the first substrate, the TFT including a gate electrode, a semiconductor layer, a source electrode, and a drain electrode; a pixel electrode connected to the drain electrode on the first substrate; a color filter formed on the second substrate, and having a transmissive pattern formed in a metal layer, the transmissive pattern comprising a plurality of sub-wavelength holes having a period, wherein a desired color of light is output by selectively transmitting light of a specific wavelength by using a surface plasmon, and the plurality of sub-wavelength holes are arranged in a triangular lattice having a predetermined number of nearest neighboring holes with respect to a central hole; and liquid crystal disposed between the first substrate and the second substrate, wherein an electric field is generated between the pixel electrode on the first substrate and the color filter on the second substrate to drive the liquid crystal.

According to an embodiment of the invention, a method for fabricating a liquid crystal display (LCD) device includes providing a first substrate and second substrate; forming a thin film transistor (TFT) on the first substrate, the TFT including a gate electrode, a semiconductor layer, a source electrode, and a drain electrode; forming a pixel electrode connected to the drain electrode on the first substrate; forming a common electrode on one of the first substrate and the second substrate; forming a color filter on one of the first substrate and the second substrate, the color filter having a transmissive pattern formed in a metal layer, the transmissive pattern comprising a plurality of sub-wavelength holes having a period, wherein a desired color of light is output by selectively transmitting light of a specific wavelength by using surface plasmon, and the plurality of sub-wavelength holes are arranged in a triangular lattice having a predetermined number of nearest neighboring holes with respect to a central hole; and bonding the first and second substrates to each other.

According to an embodiment of the invention, a method for fabricating a liquid crystal display (LCD) device includes providing a first substrate and a second substrate; forming a thin film transistor (TFT) on the first substrate, the TFT including a gate electrode, a semiconductor layer, a source electrode, and a drain electrode; forming a pixel electrode connected to the drain electrode on the first substrate; forming a color filter on the second substrate, the color filter having a transmissive pattern formed in a metal layer, the transmissive pattern comprising a plurality of sub-wavelength holes having a period, wherein a desired color of light is output by selectively transmitting light of a specific wavelength by using the surface plasmon, and the plurality of sub-wavelength holes are arranged in a triangular lattice having a predetermined number of nearest neighboring holes with respect to a central hole; forming an alignment layer and a spacer on at least one of the first substrate and the second substrate; and providing a liquid crystal, wherein an electric field is generated between the pixel electrode on the first substrate and the color filter on the second substrate to drive the liquid crystal.

The foregoing and other objects, features, aspects and advantages of the embodiments of the present invention will become more apparent from the following detailed description of the embodiments of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 10A to 10F are sectional views sequentially showing processes for fabricating the LCD device of FIG. 8.

DETAILED DESCRIPTION OF THE INVENTION

Description will now be given in detail of the embodiments of the present invention, with reference to the accompanying drawings.

For sake of brevity with reference to the drawings, the same or equivalent components will be provided with the same reference numbers, and description thereof will not be repeated.

Hereinafter, a color filter using a surface plasmon, a liquid crystal display (LCD) device, and a method for fabricating the same according to the present invention will be explained in more detail with reference to the attached drawings.

The conventional method for enhancing a transmittance ratio of an LC panel by improving an aperture ratio of an array substrate has many limitations. Accordingly, the conventional paradigm has to be changed into a new paradigm for enhancing a transmittance ratio of an LC panel by removing a color filter.

For this, proposed is a method for filtering light by forming a transmissive pattern at a metal layer so that light of a specific wavelength can be selectively transmitted. The embodiments of the present invention are to provide a color filter capable of transmitting RGB colors by forming a metal layer using a surface plasmon.

Figure 1:
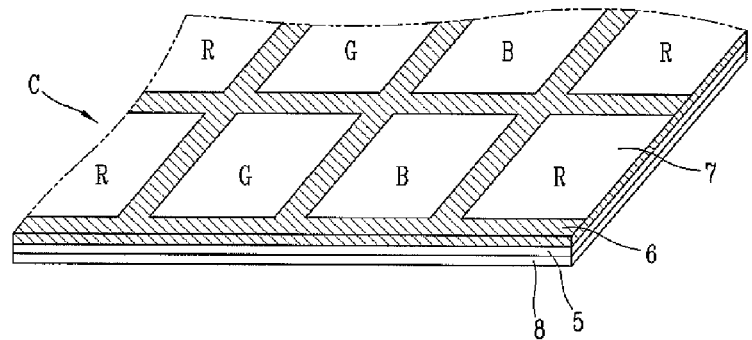
FIG. 1 is a perspective view schematically showing a structure of a liquid crystal display (LCD) device in accordance with a related art.
Figure 2:
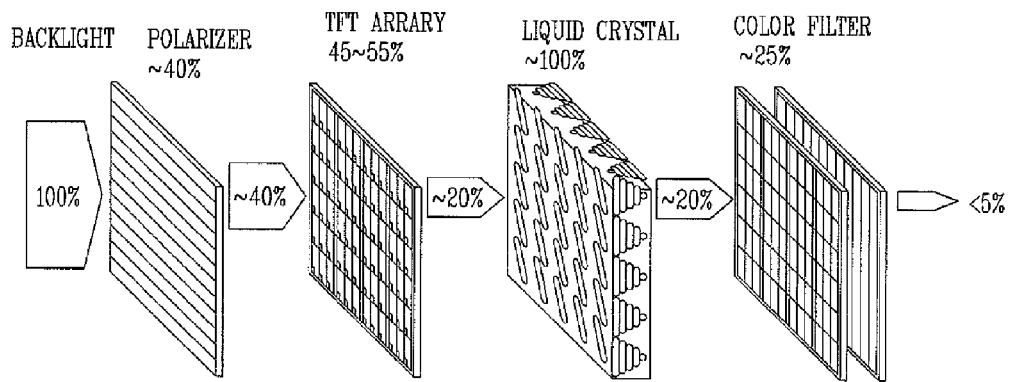
FIG. 2 is a view schematically showing a transmittance ratio of an LC panel when applying a color filter using a conventional pigment dispersing method.
Figure 3A:
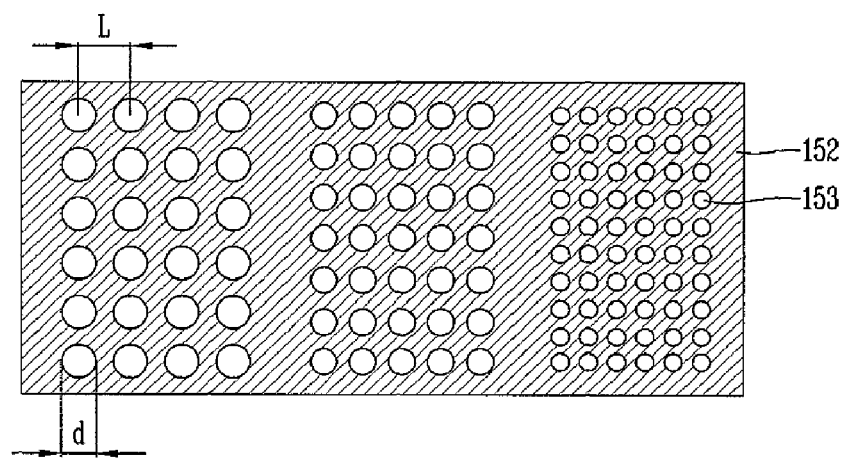
FIGS. 3A and 3B are respectively a planar view and a sectional view, which schematically show a structure of a color filter using a surface plasmon according to an embodiment of the present invention.
Figure 3B:
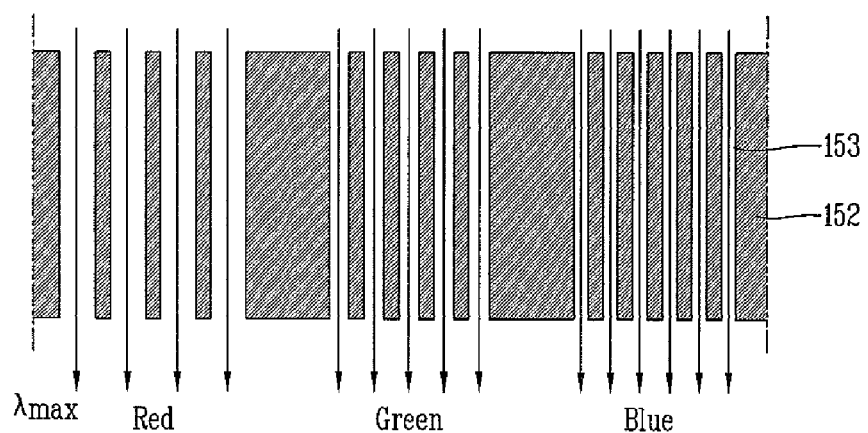

FIGS. 3A and 3B are respectively planar and sectional views schematically showing a structure of a color filter fabricated by using a surface plasmon phenomenon according to an embodiment of the present invention.

Referring to FIG. 3, a transmissive pattern 153 consisting of a plurality of sub-wavelength holes having a predetermined period (L) is formed in a metal layer 152. An electric field of incident light having both a wavelength of near infrared light and a wavelength of visible light is coupled to a plasmon. Accordingly, only light of specific wavelengths is transmitted, and light of other wavelengths is reflected, thereby obtaining RGB colors.

For instance, if a sub-wavelength hole pattern having a predetermined period (L) is formed on a silver film, selected RGB light of specific wavelengths is transmitted according to a size (d) and a period (L) of a hole, thereby implementing RGB colors. A greater amount of light than a hole area may be transmitted by absorbing light near the hole.

For reference, a plasmon refers to a quasiparticle that free electrons induced on a surface of metal oscillate collectively by an electric field of incident light. A surface plasmon indicates that the plasmon partially exists on the metal surface, which corresponds to an electromagnetic wave that proceeds along an interface between the metal and a dielectric.

The surface plasmon phenomenon refers to forming light of a specific wavelength as light of a specific wavelength incident onto a surface of metal having a nano-sized periodic hole pattern resonates with free electrons on the metal surface. Only light of specific wavelengths is made to transmit through the hole, and light of other wavelengths is made to be reflected from the metal surface.

Generally, a thick metal layer can not transmit incident light. If a hole formed at the metal layer has a size much smaller than a wavelength of incident light, an intensity of transmitted light is significantly decreased. However, if the sub-wavelength small holes are periodically arranged at the metal layer, a transmittance ratio of light is significantly increased due to excitation of a surface plasmon. Generally, a dispersion curve of light or photon does not cross a dispersion curve of a surface plasmon. In order to directly couple the photon to the surface plasmon, a grating structure of a hole pattern having a predetermined period is formed on the surface of the metal layer. This may satisfy the conservation of momentum, thereby causing the surface plasmon to be excited.

By controlling the transmissive pattern, i.e., a size and period of the hole and a thickness of the metal layer, etc., light of a desired wavelength may be transmitted. In a metal layer provided with a square structure with holes having a period of 'L', a prime peak wavelength of light perpendicularly incident onto the metal layer, i.e., a surface plasmon resonance wavelength may be obtained by the following Equation 1.

$$\lambda_{spp} = L\sqrt{\frac{\varepsilon_m \varepsilon_d}{\varepsilon_m + \varepsilon_d}}$$ [Equation 1]

Here, $\varepsilon_m$ indicates a dielectric constant of metal, and $\varepsilon_d$ indicates a dielectric constant of a dielectric material adjacent to the metal. That is, a peak wavelength of light transmitted by a surface plasmon may be controlled by changing a period of a transmissive pattern or by changing a dielectric material.

The transmissive pattern may have not only a circular shape such as a hole, but also various shapes such as an oval shape, a quadrangular shape, a triangular shape, and a slit shape. When the transmissive pattern has a circular shape, the hole may have a diameter of about 50 nm to 100 μm and a period of about 50 nm to 500 nm.

An amplitude and a half-width of a surface plasmon resonance greatly depend on refractive indexes of dielectric materials near the metal layer. If a refractive index of the dielectric material which fills the transmissive pattern does not match a refractive index of the substrate, both a surface plasmon mode between the substrate and the metal layer, and a surface plasmon mode between the dielectric material and the metal layer occur. Accordingly, two peculiar peaks occur at a transmission spectrum. When the refractive index of the dielectric material is larger than that of the substrate, additional peaks occur at a long wavelength bandwidth. On the other hand, when the refractive index of the dielectric material is smaller than that of the substrate, additional peaks occur at a short wavelength bandwidth. However, if the dielectric materials near the metal layer undergo refractive index matching, one surface plasmon resonance is excited at a region of the metal layer. This may allow only one peak having excellent monochromaticity to occur at a transmission spectrum of visible light.

In an embodiment of the present invention, an insulating layer formed of a dielectric material having a refractive index equal to or similar to that of the substrate is deposited on the metal layer. This may enhance a transmittance rate of light by a surface plasmon and may enhance color reproduction. Furthermore, since the insulating layer deposited on the metal layer replaces an over coating layer, the entire processes may be simplified.

Figure 4A:
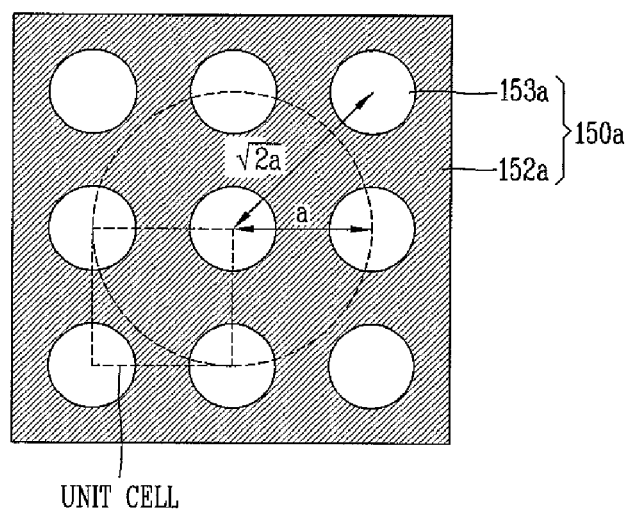
FIGS. 4A and 4B are planar views schematically showing a color filter having a quadrangular lattice structure according to a first embodiment of the present invention.
Figure 4B:
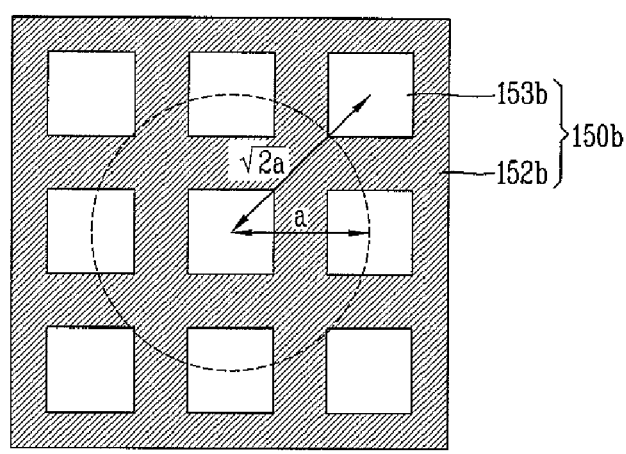

FIGS. 4A and 4B are planar views schematically showing color filters having a quadrangular lattice structure according to a first embodiment of the present invention, in which the color filters have transmissive patterns formed of circular holes and quadrangular holes, respectively.

As shown, color filters 150a and 150b according to a first embodiment of the present invention are implemented as transmissive patterns 153a and 153b consisting of a plurality of sub-wavelength holes having a predetermined period in directions of rows and columns are formed in metal layers 152a and 152b. The color filters 150a and 150b implement desired colors by selectively transmitting light of a specific wavelength.

The color filters 150a and 150b according to a first embodiment of the present invention are formed such that the holes are periodically arranged in the form of a quadrangular lattice.

Here, a prime peak wavelength of light passing through the hole is proportional to a period (a). Also, an intensity of transmitted light is proportional to the number of the nearest neighboring holes or a hole density. Accordingly, a density of the nearest neighboring hole has to be increased in order to enhance a color purity and a transmittance rate of light.

More concretely, the number of the nearest neighboring holes spacing from the central hole by a period (a) in the quadrangular lattice structure is four. The nearest neighboring holes are arranged in horizontal and vertical directions with respect to the central hole. A distance from the central hole to the next-nearest neighboring holes is 1.414 times of the period (a). The next-nearest neighboring holes are arranged in a diagonal direction with respect to the central hole.

Geometrically, a density of the nearest neighboring hole in the quadrangular lattice structure is not greater than that in a triangular lattice structure. For instance, when forming the transmissive patterns 153a and 153b with circular holes having a radius (r), an area ratio between openings and non-openings per unit cell of the quadrangular lattice is $\pi r^2/\alpha^2$. On the other hand, an area ratio between openings and non-openings per unit cell of the triangular lattice is $1.15(\pi r^2/\alpha^2)$. This means that the quadrangular lattice structure is not an optimized structure in the aspects of a transmittance rate and color reproduction.

In order to implement an optimum structure for enhancing a transmittance rate and color reproduction, a density of the nearest neighboring holes has to be increased. This will be explained in more detail with reference to a second embodiment of the present invention.

Figure 5A:
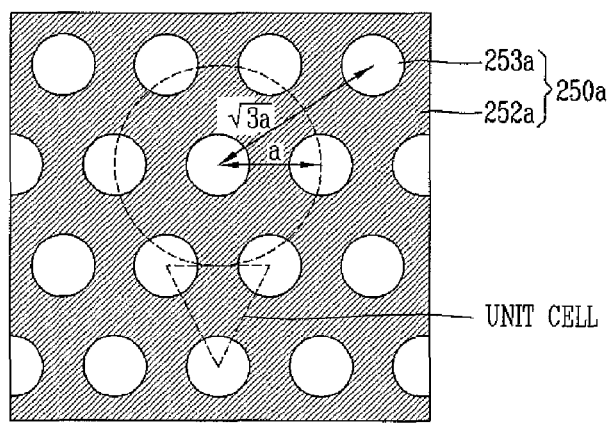
FIGS. 5A and 5C are planar views schematically showing a color filter having a triangular lattice structure according to a second embodiment of the present invention.
Figure 5B:
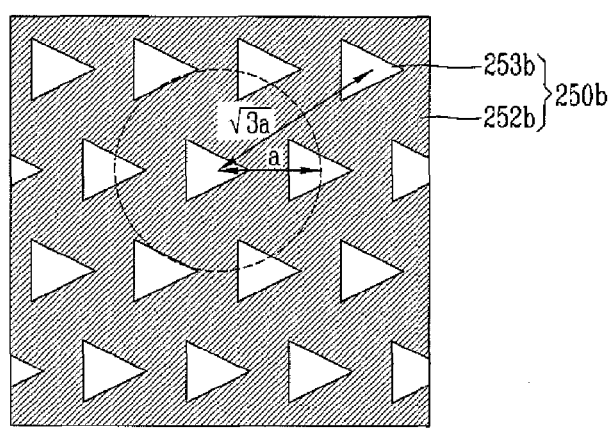
Figure 5C:
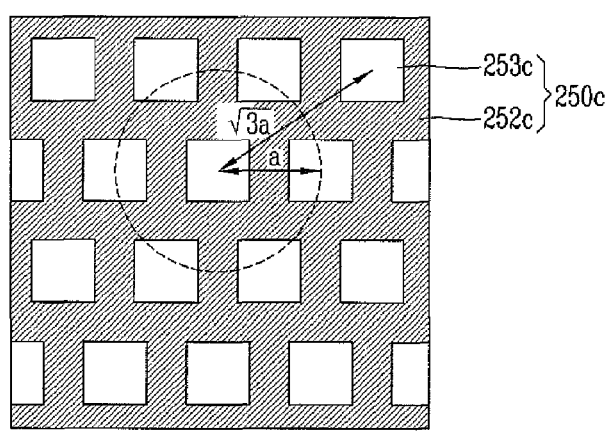

FIGS. 5A and 5C are planar views schematically showing a color filter having a triangular lattice structure according to a second embodiment of the present invention, in which the color filters have transmissive patterns formed of circular holes, triangular holes and quadrangular holes, respectively.

As shown, color filters 250a to 250c according to the second embodiment of the present invention are implemented as transmissive patterns 253a to 253c consisting of a plurality of sub-wavelength holes having a predetermined period in directions of rows and columns formed in metal layers 252a to 252c. The color filters 250a to 250c implement desired colors by selectively transmitting light of a specific wavelength.

The color filters 250a to 250c according to the second embodiment of the present invention are formed such that the holes are periodically arranged in the form of a triangular lattice. That is, the color filters 250a to 250c according to the second embodiment respectively has a triangular lattice structure in which six nearest neighboring holes are positioned near the central hole of the transmissive patterns 253a to 253c. Accordingly, the arrangement of the six nearest neighboring holes roughly traces a hexagon. Additionally, the arrangement of the six nearest neighboring holes with respect to a central hole form six triangular lattice. Each triangular lattice traces an equilateral triangle, which has three internal angles that are the same, namely, 60 degrees. Each triangular lattice is traced by the central hole and two immediately adjacent nearest neighboring holes.

Here, a distance from the central hole to the nearest neighboring hole is equal to the period, and a distance from the central hole to the next-nearest neighboring hole is 1.732 times of the period. The distance may be between a center of the central hole to a center of the nearest neighboring hole or between the center of the central hole to a center of the next-nearest neighboring hole.

As aforementioned, a horizontal sectional surface (e.g., a cross sectional shape) of the holes of the transmissive patterns 253a to 253c may have one of a circular shape, a quadrangular shape, a triangular shape, an oval shape, and a slit shape having an aspect ratio more than one. In this instance, the aspect ratio indicates a ratio between a length of a long axis and a length of a short axis of a predetermined figure.

The metal layers 252a to 252c are preferably, but not necessarily, formed of aluminum (Al) which can implement a surface plasmon resonance on the entire regions of visible rays. However, embodiments of the present invention are not limited to this. More concretely, the metal layers 252a to 252c may be formed of a conductive material including at least one selected from a group consisting of aluminum (Al), gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

Preferably, but not necessarily, the holes of the transmissive patterns 253a to 253c have sizes of about 100 nm to 300 nm. However, the embodiments of the present invention are not limited to this. That is, the hole may have a size of about 50 nm to 10 µM, and may have a period of about 50 nm to 500 nm.

Figure 6A:
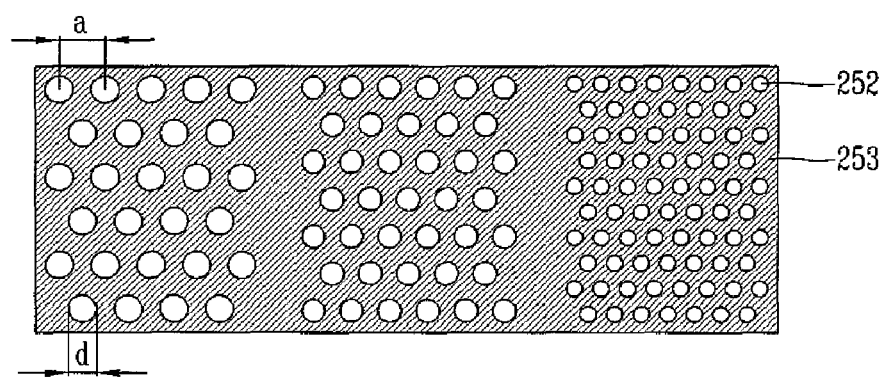
FIGS. 6A and 6B are respectively a planar view and a sectional view schematically showing a structure of a color filter using a surface plasmon according to a second embodiment of the present invention.
Figure 6B:
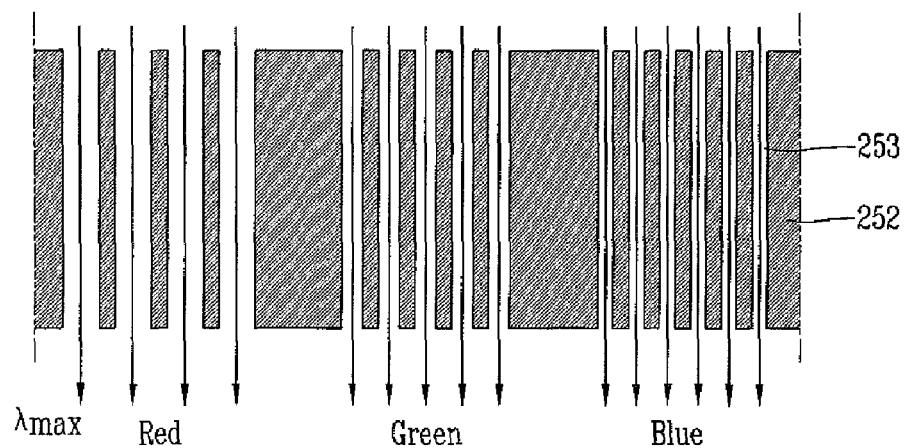

FIGS. 6A and 6B are respectively a planar view and a sectional view schematically showing a structure of a color filter using a surface plasmon according to a second embodiment of the present invention.

The color filter according to the second embodiment of the present invention is implemented as holes of a transmissive pattern 253 that are periodically arranged in the form of a triangular lattice structure. Once the transmissive pattern 253 consisting of a plurality of sub-wavelength holes having a predetermined period (a) is formed in a metal layer 252, an electric field of incident light having both a wavelength of near infrared light and a wavelength of visible light is coupled to a plasmon. Accordingly, only light of specific wavelengths is transmitted, and light of other wavelengths is reflected, thereby obtaining RGB colors.

If light is incident from a lower side of the substrate, only light of a specific wavelength determined by the period of the transmissive pattern 253 passes through the substrate. That is, when the transmissive pattern 253 has a period (a), a prime peak wavelength of transmitted light may be set as $1 \leq \lambda/a \leq 2$ (particularly, $\lambda=1.65 \times a$). The transmissive pattern 253 may be divided, in the same metal layer 252, into a plurality of regions having different periods. Light of different wavelengths may selectively pass through the divided regions.

In using aluminum having a thickness of 150 nm as the metal layer 252, in order to transmit red light of a prime peak wavelength of 650 nm, the hole has a period (a) of about 400 (particularly, 394 nm) and a size (d) of about 200 (particularly, 197 nm). In order to transmit green light of a prime peak wavelength of 550 nm, the hole has a period (a) of about 350 (particularly, 333 nm) and a size (d) of about 180 (particularly, 167 nm). Also, in order to transmit blue light of a prime peak wavelength of 450 nm, the hole has a period (d) of about 300 (particularly, 272 nm) and a size (d) of about 150 (particularly, 136 nm).

In order to implement a color of a high purity, each thickness of the metal layer 252 corresponding to each wavelength may be differently controlled to obtain a metal layer 252 having a plurality of thicknesses at different portions. However, the embodiments of the present invention are not limited to this.

In the triangular lattice structure according to the second embodiment of the present invention, the number of the nearest neighboring holes is more increased by 1.5 times than that in the quadrangular lattice structure according to the first embodiment of the present invention. Also, an area ratio between openings and non-openings when the hole has a circular shape in the triangular lattice structure is increased by 1.15 times than that in the quadrangular lattice structure.

Accordingly, an aperture ratio may be enhanced by 15% or more. This may implement a full color filter which provides an excellent monochromaticity and transmittance ratio. Furthermore, a prime peak wavelength of transmitted light may be controlled by changing the period of the transmissive pattern in the same metal layer, thereby easily controlling colors of the color filter.

The transmissive pattern consisting of a plurality of holes having a specific period and size is formed in the metal layer. The metal layer is used as a color filter by using a surface plasmon occurring therefrom, and the color filter is applied to an LCD device to implement colors.

The conventional color filter is formed on an upper substrate of a color filter substrate. However, the color filter using a surface plasmon according to the present invention may be formed on a lower array substrate, or outside the lower array substrate.

More concretely, the conventional color filter using pigments or dyes can not undergo a high temperature process. On the other hand, the color filter using a surface plasmon according to the embodiments of the present invention may undergo a high temperature process, because the metal layer serves as the color filter. This may allow a thin film transistor to be fabricated on the metal layer through the high temperature process. Furthermore, since the color filter is formed at the lower array substrate, such a configuration is able to be solved or decrease the conventional problem of decrease of an aperture ratio occurring as an alignment margin is obtained when bonding the upper and lower substrates to each other.

Figure 7:
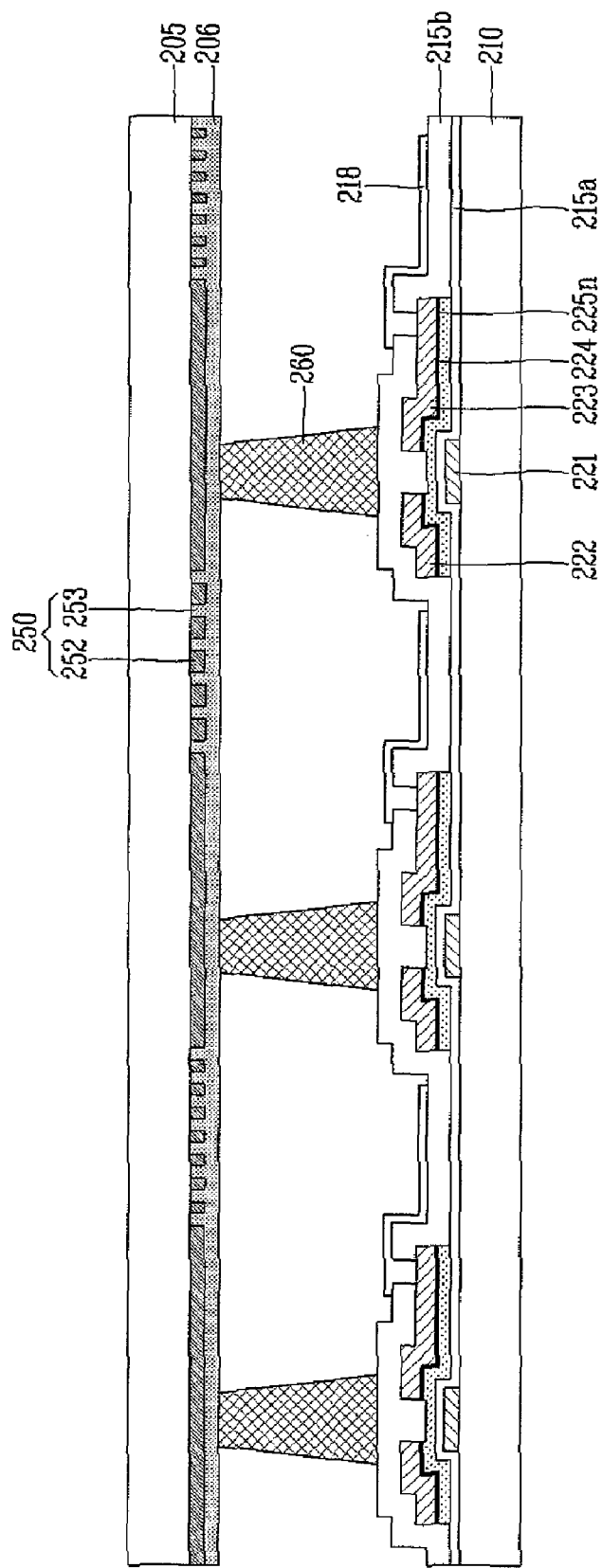
FIG. 7 is a sectional view schematically showing one structure of a liquid crystal display (LCD) device according to a second embodiment of the present invention.
Figure 8:
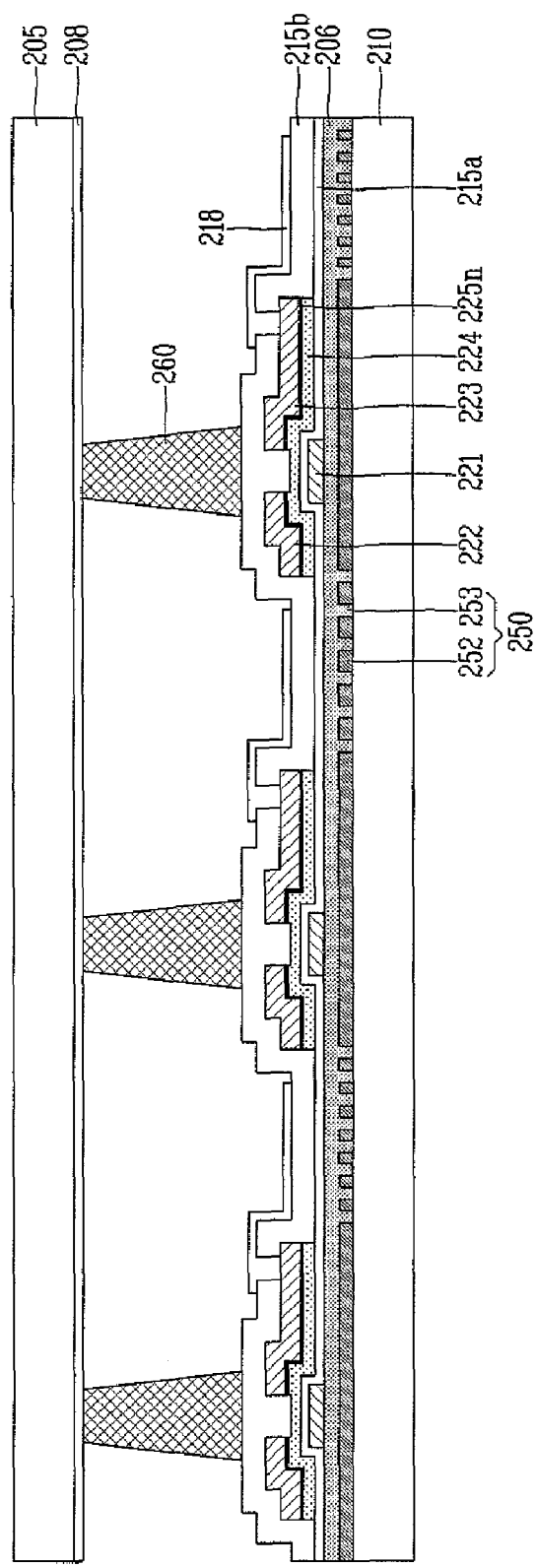
FIG. 8 is a sectional view schematically showing another structure of the liquid crystal display (LCD) device according to a second embodiment of the present invention.

FIGS. 7 and 8 are sectional views schematically showing a structures of a liquid crystal display (LCD) device according to a second embodiment of the present invention. For convenience, the same components are provided with the same reference numeral.

As shown, the color filter according to the second embodiment of the present invention has the transmissive pattern formed in the metal layer, the transmissive pattern consisting of a plurality of sub-wavelength holes having a predetermined period in directions of rows and columns. The color filter implements desired colors by selectively transmitting light of a specific wavelength.

The color filter according to the second embodiment of the present invention is formed such that the holes are periodically arranged in the form of a triangular lattice. That is, the color filter according to the second embodiment of the present invention may have a triangular lattice structure in which six nearest neighboring holes are positioned near a central hole of the transmissive pattern.

In order to apply the color filter using a surface plasmon to an LCD device, as shown in FIG. 7, the color filter 250 according to the second embodiment of the present invention may be formed on an upper color filter substrate 205.

This is advantageous in that a transmissive pattern is formed on a single metal layer by one step process thus to implement RGB colors. Also, the transmissive pattern is used instead of an upper common electrode or a back electrode, thereby simplifying the entire processes and reducing the fabrication costs.

As aforementioned, the color filter 250 using a surface plasmon is advantageous to a color purity and a transmittance ratio when refractive index matching has been performed among the dielectric materials near the metal layer 252. Accordingly, in forming the color filter 250 on a glass substrate, an insulating layer 206 formed of the same material as the glass substrate, such as $SiO_2$, is preferably, but not necessarily, formed on the metal layer 252 including the transmissive pattern 253.

The color filter substrate 205 is bonded to an array substrate as they face each other, by a sealant formed on an outer periphery of an image display region, in a state that a constant cell gap is maintained therebetween by a column spacer 260. The array substrate 210 consists of a plurality of gate lines and data lines arranged in horizontal and vertical directions to define a plurality of pixel regions, Thin Film Transistors (TFT), switching devices formed at intersections between the gate lines and the data lines, and pixel electrodes 218 formed in the pixel regions.

The TFT consists of a gate electrode 221 connected to the gate line, a source electrode 222 connected to the data line, and a drain electrode 223 connected to the pixel electrode 218. The TFT further includes a first insulating layer 215a for insulating the gate electrode 221 and the source/drain electrodes 222 and 223 from each other, and an active pattern 224 for forming a conductive channel between the source electrode 222 and the drain electrode 223 by a gate voltage applied to the gate electrode 221. Reference numeral 215b indicates a second insulating layer, and reference numeral 225n indicates an ohmic-contact layer for ohmic-contact between source/drain regions of the active pattern 224 and the source/drain electrodes 222 and 223. Additionally, an alignment layer may be formed on at least one of the array substrate 210 and the upper color filter substrate 205. Liquid crystal is provided between the array substrate 210 and the upper color filter substrate 205.

The color filter using a surface plasmon is not damaged during a high temperature process since the metal layer is used. With this consideration, the color filter may be formed on the array substrate.

In FIG. 7, the color filter 250 is shown as being formed at an inner surface of the upper color filter substrate 205. In other embodiments, the color filter 250 may be formed at an outer surface of the an upper color filter substrate 205. In such an instance, an upper common electrode or a back electrode may be formed on the upper color filter substrate 205.

As shown in FIG. 8, the color filter 250 using a surface plasmon may be formed inside a cell, i.e., below a TFT array. The color filter 250 may be also formed outside the cell, i.e., on an outer surface of the array substrate 210.

A common electrode 208 except for (or lacking) a color filter and a black matrix may be formed on the color filter substrate 205. The color filter 250 formed on the array substrate 210 may be floated or grounded.

In forming the color filter 250 on the array substrate 210, a margin for aligning the color filter substrate 205 and the array substrate 210 is not required. This may allow an aperture ratio to be increased at the time of designing an LC panel, thereby enhancing a transmittance ratio of the LC panel. If the transmittance ratio of the LC panel is enhanced, brightness of a backlight may be decreased to reduce power consumption by the backlight.

As the power consumption by the backlight is reduced, multi color pixels can be implemented to obtain a high picture quality with real color reproduction.

In forming the color filter 250 on the array substrate 210 and removing production lines for color filter processing, the installation costs may be reduced by about 50%.

In FIG. 8, the color filter 250 is shown as being formed at an inner surface of the array substrate 210. In other embodiments, the color filter 250 may be formed at an outer surface of the array substrate 210.

Hereinafter, a structure of an LCD device in forming the color filter using a surface plasmon on the array substrate, and a method for fabricating the same will be explained in more detail with reference to the attached drawings.

Figure 9:
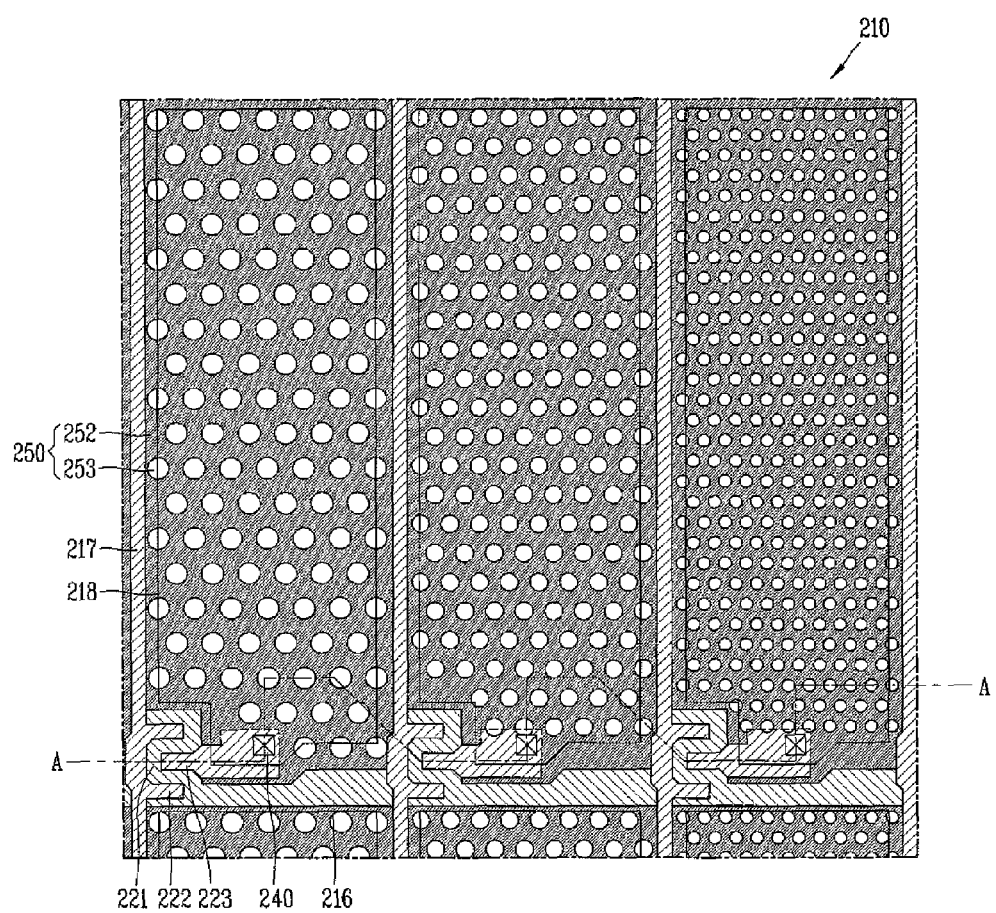
FIG. 9 is a planar view schematically showing a part of an array substrate of the LCD device according to a second embodiment of the present invention.

FIG. 9 is a planar view schematically showing a part of the array substrate of the LCD device shown in FIG. 8 according to a second embodiment of the present invention.

FIG. 9 shows one pixel composed of sub-color filters corresponding to blue, red and green colors from the left side. However, the embodiments of the present invention are not limited to this. That is, the embodiments of the present invention may be also applied to implement multi-colors of more than three colors.

The sub-color filters corresponding to blue, red and green colors consist of the same components except for a structure of the color filter, i.e., a hole size and a period of the transmissive pattern.

The LCD device according to the embodiments of the present invention are a Twisted Nematic (TN) LCD device for driving nematic liquid crystal molecules in a direction perpendicular to a substrate. However, the embodiments of the present invention are not limited to this.

The array substrate 210 consists of a plurality of gate lines 216 and data lines 217 arranged in horizontal and vertical directions thereon to define a plurality of pixel regions. A thin film transistor (TFT) as a switching device is formed at an intersection between the gate line 216 and the data line 217, and a pixel electrode 218 for driving an LC layer together with the common electrode 208 by being connected to the TFT is formed in the pixel region.

The TFT consists of a gate electrode 221 constituting a part of the gate line 216, a source electrode 222 connected to the data line 217, and a drain electrode 223 connected to the pixel electrode 218. The TFT further includes a first insulating layer for insulating the gate electrode 221 and the source/drain electrodes 222 and 223 from each other, and an active pattern for forming a conductive channel between the source electrode 222 and the drain electrode 223 by a gate voltage applied to the gate electrode 221.

A part of the source electrode 222 extends towards one direction to constitute a part of the data line 217. Also, a part of the drain electrode 223 extends towards the pixel region to be electrically connected to the pixel electrode 218 through a contact hole 240 of a second insulating layer.

The color filter 250 using a surface plasmon according to the second embodiment of the present invention is disposed on the array substrate 210. The color filter 250 has the transmissive pattern 253 formed in the metal layer 252, the transmissive pattern 253 consisting of a plurality of sub-wavelength holes having a predetermined period. An electric field of incident light having both a wavelength of near infrared light and a wavelength of visible light is coupled to a plasmon. Accordingly, only light of specific wavelengths is transmitted, and light of other wavelengths is reflected, thereby obtaining RGB colors.

The transmissive pattern 253 is formed in the pixel region except for a region where the gate line 216, the data line 217 and the TFT are formed.

The color filter 250 according to the second embodiment of the present invention is formed such that the holes are periodically arranged in the form of a triangular lattice. That is, the color filter 250 according to the second embodiment of the present invention may have a triangular lattice structure in which six nearest neighboring holes are positioned near the central hole of the transmissive pattern 253. In other embodiments, the number of nearest neighboring holes need not be six, and may even be more than six.

Here, a distance from the central hole to the nearest neighboring hole is equal to the period, and a distance from the central hole to the next-nearest neighboring hole is 1.732 times of the period.

A horizontal sectional surface of the hole of the transmissive pattern 253 may have one of a circular shape, a quadrangular shape, a triangular shape, an oval shape, and a slit shape having an aspect ratio more than one. The metal layer 252 is preferably, but not necessarily, formed of aluminum (Al) which can implement a surface plasmon resonance on the entire regions of visible rays. However, the embodiments of the present invention are not limited to this. More concretely, the metal layer 252 may be formed of a conductive material including at least one selected from a group consisting of aluminum, gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

Preferably, but not necessarily, the hole of the transmissive pattern 253 has a size of about 100 nm to 300 nm. However, the embodiments of the present invention are not limited to this. That is, the hole may have a size of about 50 nm to 10 µm, and may have a period of about 50 nm to 500 nm.

FIGS. 10A to 10F are sectional views sequentially showing processes for fabricating the LCD device of FIG. 8, and FIGS. 11A to 11E are planar views sequentially showing processes for fabricating the array substrate of FIG. 9.

Figure 10A:
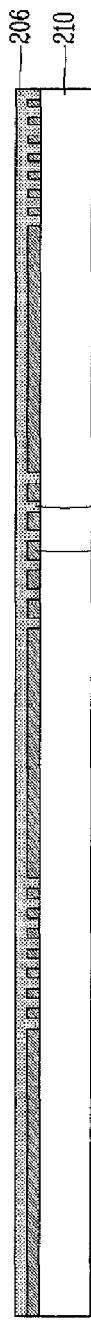
Figure 11A:
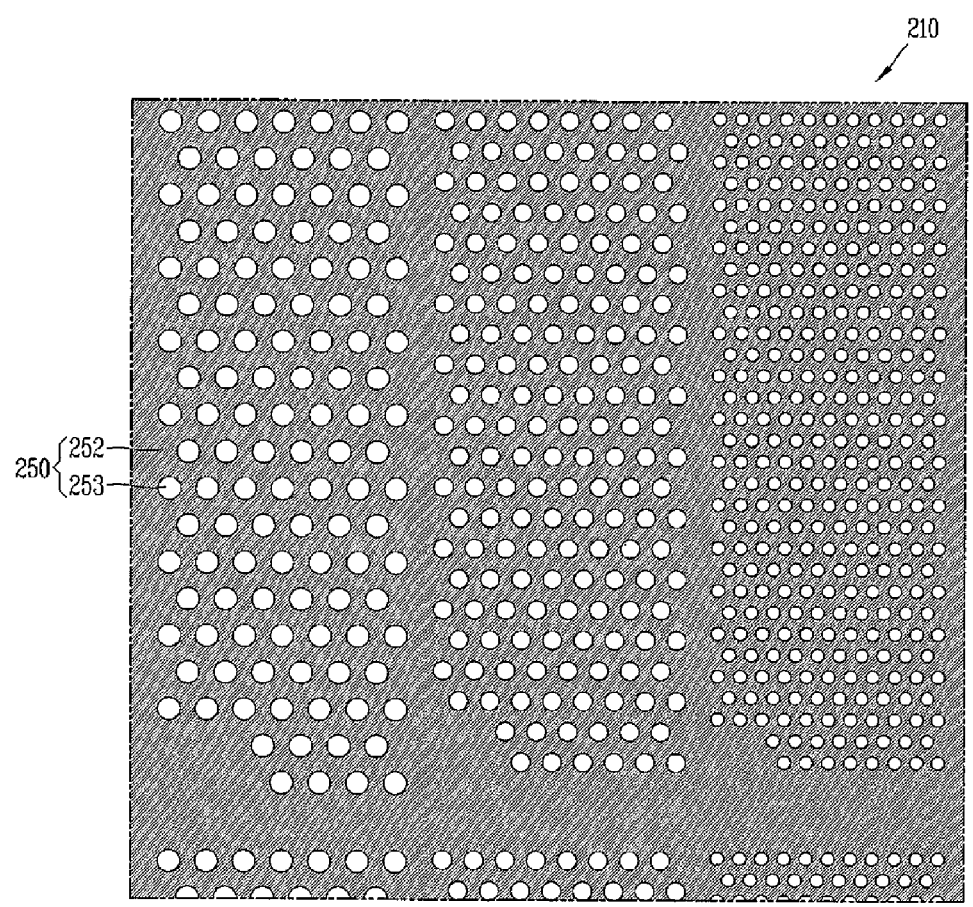
FIGS. 11A to 11E are planar views sequentially showing processes for fabricating the array substrate of FIG. 9.

As shown in FIGS. 10A and 11A, the color filter 250 using a surface plasmon according to the second embodiment of the present invention is formed on the array substrate 210 formed of a transparent insulating material such as glass.

The color filter 250 has the transmissive pattern 253 formed in the metal layer 252, the transmissive pattern 253 consisting of a plurality of sub-wavelength holes having a predetermined period. An electric field of incident light having both a wavelength of near infrared light and a wavelength of visible light is coupled to a plasmon. Accordingly, only light of specific wavelengths is transmitted, and light of other wavelengths is reflected, thereby obtaining RGB colors.

The color filter 250 according to the second embodiment of the present invention may have a triangular lattice structure in which six nearest neighboring holes are positioned near a central hole of the transmissive pattern 253.

Here, a distance from the central hole to the nearest neighboring hole is equal to the period, and a distance from the central hole to the next-nearest neighboring hole is 1.732 times of the period.

A horizontal sectional surface of the hole of the transmissive pattern 253 may have one of a circular shape, a quadrangular shape, a triangular shape, an oval shape, and a slit shape having an aspect ratio more than one. The metal layer 252 is preferably, but not necessarily, formed of aluminum (Al) which can implement a surface plasmon resonance on the entire regions of visible rays. However, the embodiments of the present invention are not limited to this. More concretely, the metal layer 252 may be formed of a conductive material including at least one selected from a group consisting of aluminum, gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

Preferably, but not necessarily, the hole of the transmissive pattern 253 has a size of about 100 nm to 300 nm. However, the embodiments of the present invention are not limited to this. That is, the hole may have a size of about 50 nm to 10 µm, and may have a period of about 50 nm to 500 nm.

The metal layer 252 may be formed by using one of a gas phase method, a liquid phase method, a solid phase method, and a nanosol coating method. Also, the transmissive pattern 253 may be formed by using one of an e-beam lithography, an ion beam milling, a nanosphere lithography, a nano imprinting, a photolithography, and a laser interference lithography.

Then, a dielectric material having a refractive index equal to or similar to that of the array substrate 210 is deposited above the metal layer 252 including the transmissive pattern 253, thereby forming an insulating layer 206 for planarizing the surface of the color filter 250.

The color filter 250 implements RGB colors as the transmissive pattern 253 consisting of a plurality of sub-wavelength holes having a constant period is formed in the metal layer 252.

The color filter 250 according to the second embodiment of the present invention implements RGB colors by selectively transmitting a red color through a red color transmissive pattern inside a red color region, by selectively transmitting a green color through a green color transmissive pattern inside a green color region, and by selectively transmitting a blue color through a blue color transmissive pattern inside a blue color region.

Figure 10B:
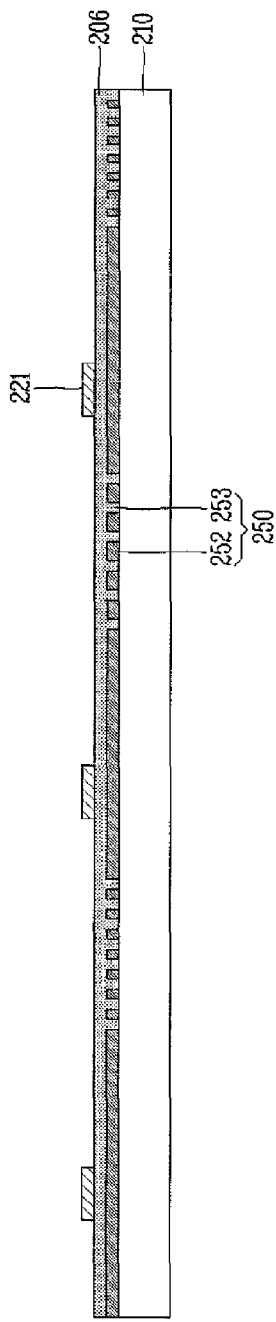
Figure 10C:
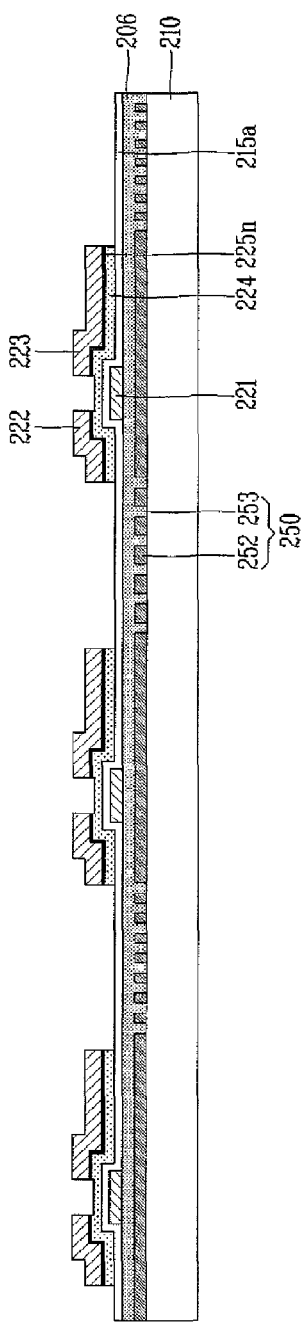
Figure 11B:
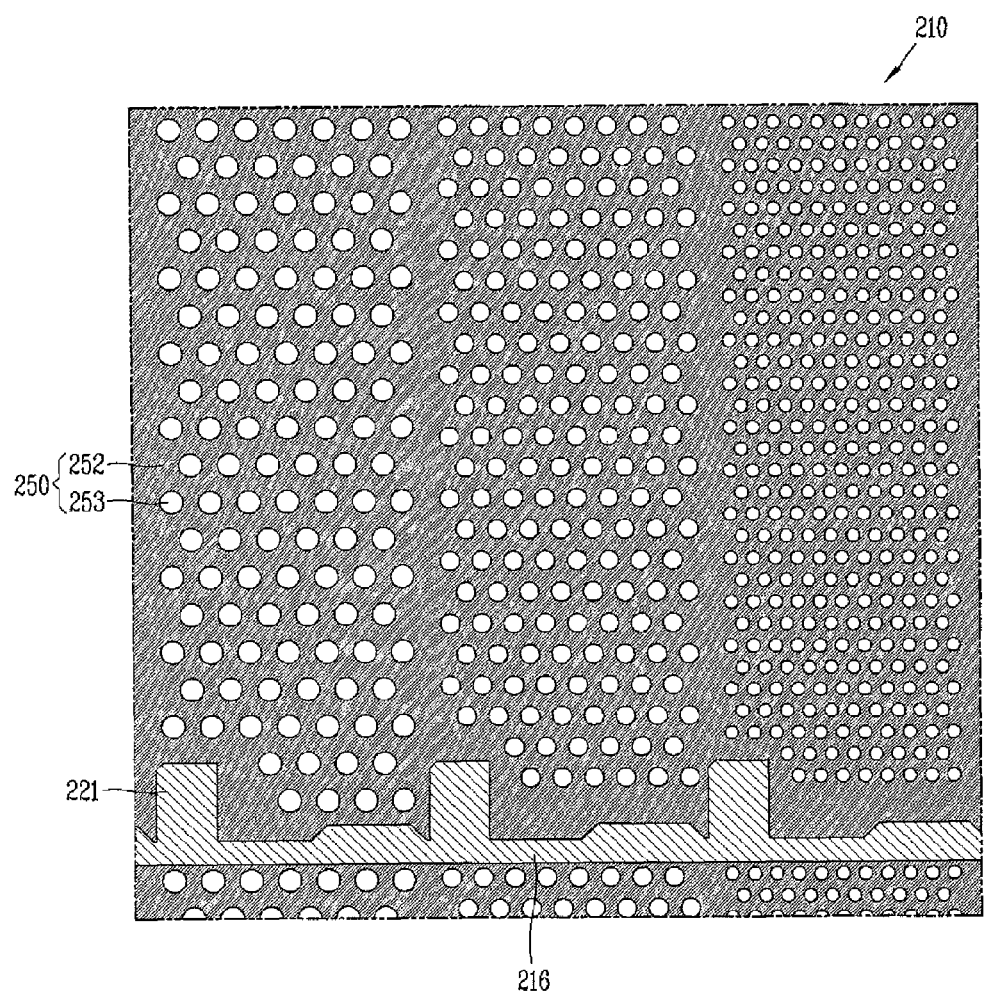
Figure 11C:
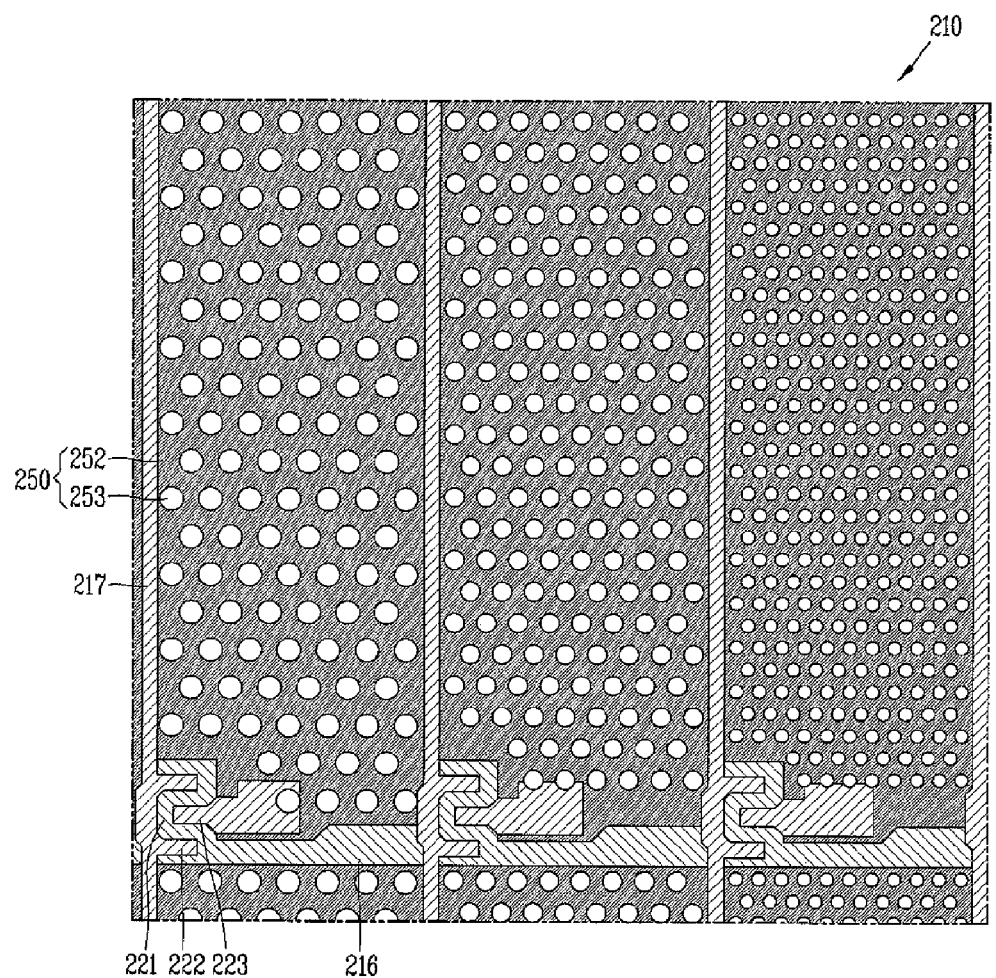
Figure 11D:
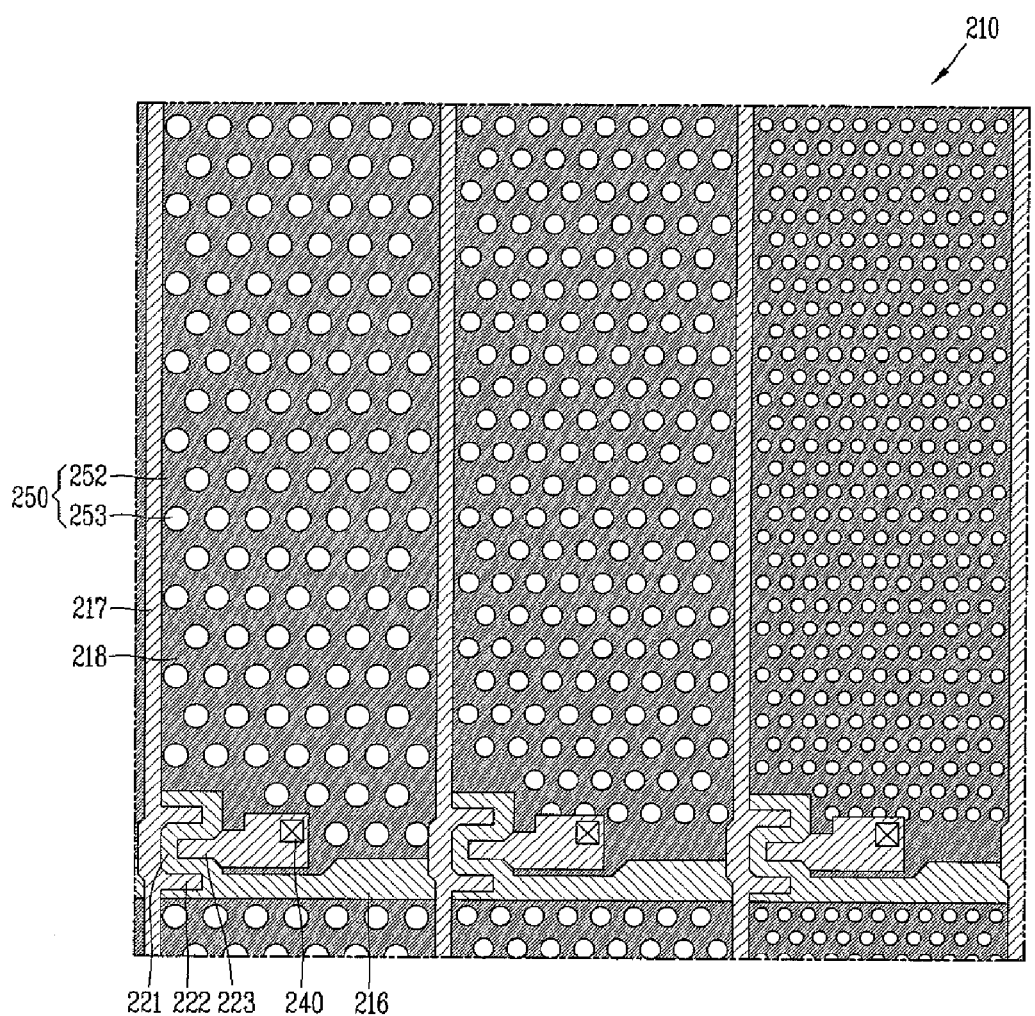

As shown in FIGS. 10B and 11B, a gate electrode 221 and a gate line 216 are formed on the array substrate 210 having the insulating layer 206 formed thereon.

Here, the gate electrode 221 and the gate line 216 are formed by depositing a first conductive film on the entire surface of the array substrate 210, and then by selectively patterning the first conductive film by a photolithography process.

The first conductive film may be formed of an opaque conductive material having a low resistance, such as aluminum (Al), Al alloy, tungsten (W), copper (Cu), chromium (Cr), molybdenum (Mo), and Mo alloy. Alternatively, the first conductive film may be formed as a multi-structure implemented as at least two of the above materials laminated on each other.

As shown in FIGS. 10O and 11O, on the entire surface of the array substrate 210 having the gate electrode 221 and the gate line 216 formed thereon, a first insulating layer 215a, an amorphous silicon thin film, an n+ amorphous silicon thin film, and a second conductive film are deposited, and then are selectively removed by a photolithography process. As a result, on the array substrate 210, formed are an active pattern 224 formed of the amorphous silicon thin film, and source/drain electrodes 222 and 223 formed of the second conductive film and electrically connected to source/drain regions of the active pattern 224.

A data line 217 formed of the second conductive film and crossing the gate line 216 to define a pixel region is formed by the photolithography process.

An ohmic contact layer 225n formed of the n+ amorphous silicon thin film, and patterned in the same shape as the source/drain electrodes 222 and 223, is formed above the active pattern 224.

An amorphous silicon thin film pattern and an n+ amorphous silicon thin film pattern, each formed of the amorphous silicon thin film and the n+ amorphous silicon thin film, respectively, and each patterned in the same shape as the data line 217, are formed below the data line 217.

The active pattern 224, the source/drain electrodes 222 and 223, and the data line 217 according to the second embodiment of the present invention may be simultaneously formed by a single mask process using a half-tone mask or a diffraction mask.

The second conductive film may be formed of an opaque conductive material having a low resistance, such as aluminum (Al), Al alloy, tungsten (W), copper (Cu), chromium (Cr), molybdenum (Mo), and Mo alloy, so as to constitute the source/drain electrodes 222 and 223 and the data line 217. Alternatively, the second conductive film may be formed as a multi-structure implemented as at least two of the above materials laminated on each other.

As shown in FIGS. 10D and 110, a second insulating layer 215b is formed on the entire surface of the array substrate 210 having the active pattern 224, the source/drain electrodes 222 and 223, and the data line 217 formed thereon. Then, the second insulating layer 215b is selectively removed by a photolithography process, thereby forming, on the array substrate 210, a contact hole 240 exposing a part of the drain electrode 223.

The second insulating layer 215b may be formed of an inorganic insulating layer such as silicon nitride or silicon oxide, or may be formed of an organic insulating layer such as photoacryl or benzocyclobutene (BCB).

Figure 11E:
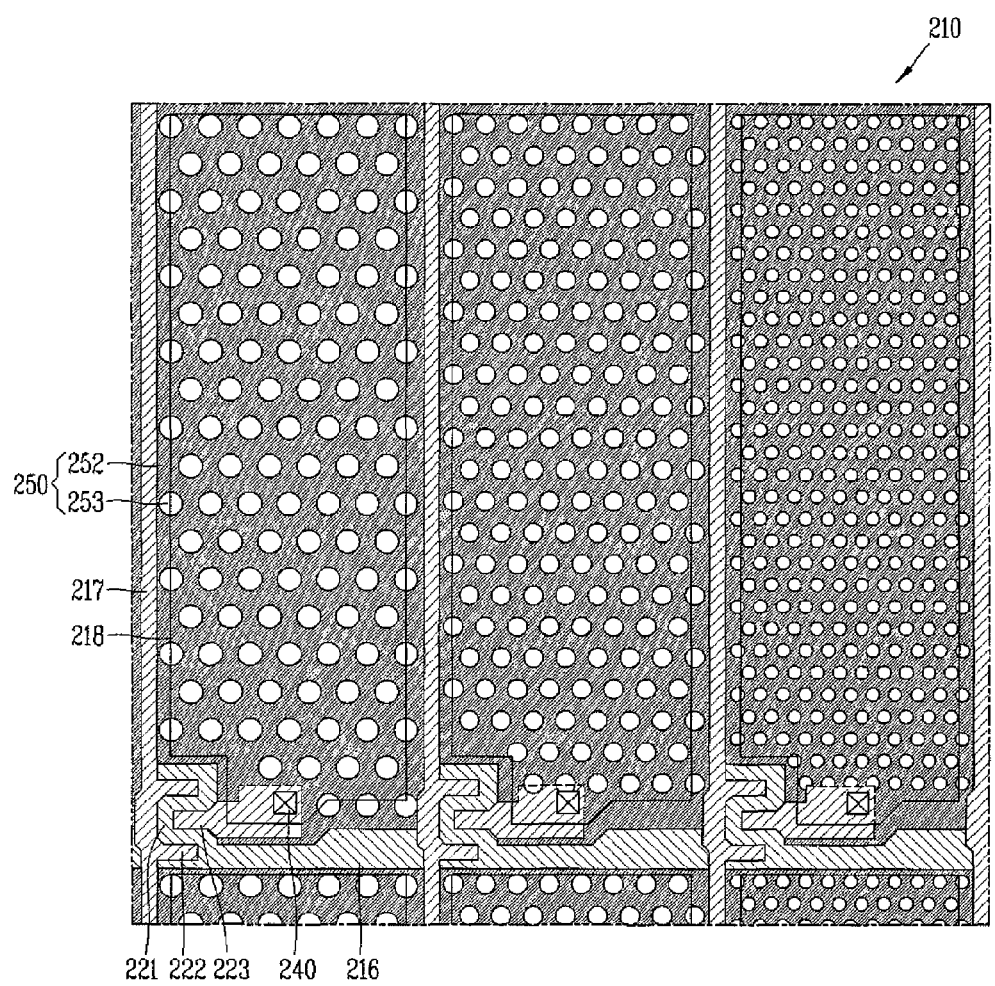

As shown in FIGS. 10E and 11E, a third conductive film is formed on the entire surface of the array substrate 210 having the second insulating layer 215b formed thereon, and then is selectively removed by a photolithography process. As a result, formed is a pixel electrode 218 electrically connected to the drain electrode 223 through the contact hole 240.

Here, the third conductive film includes a transparent conductive material having a high transmittance ratio, such as Indium Tin Oxide (ITO) or Indium Zinc Oxide (IZO) so as to constitute the pixel electrode.

Figure 10F:
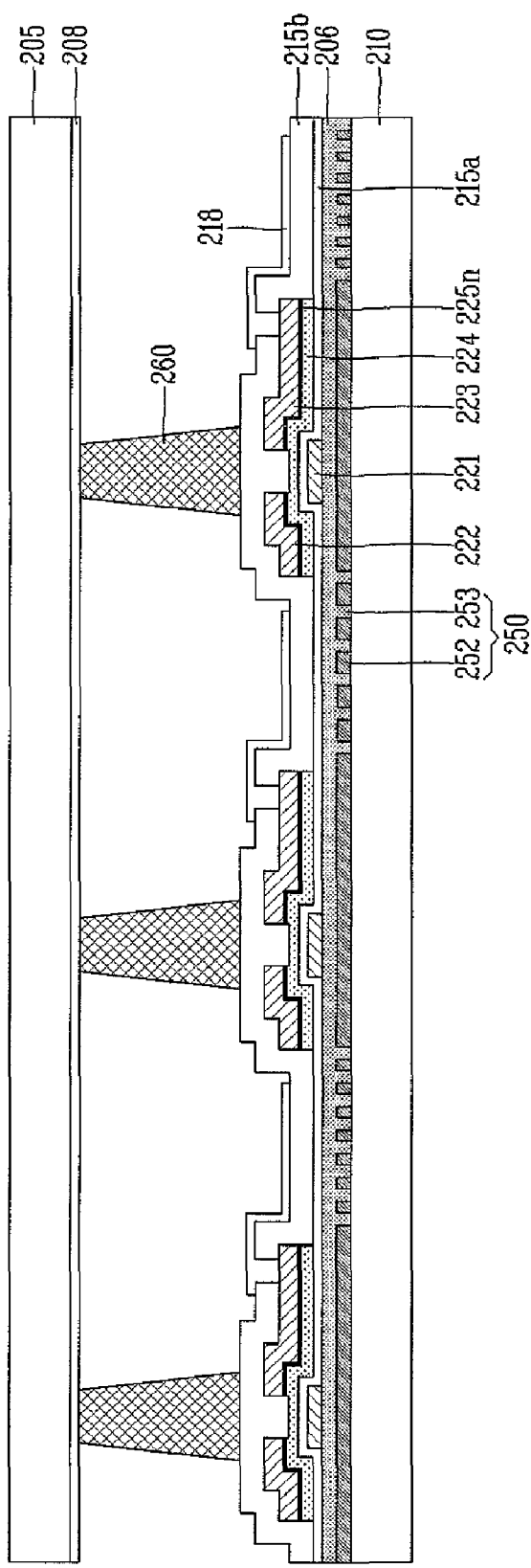

As shown in FIG. 10F, the array substrate 210 according to the second embodiment of the present invention is bonded to the color filter substrate 205 as they face each other, by a sealant formed on an outer periphery of an image display region, in a state that a constant cell gap is maintained therebetween by a column spacer 260.

A common electrode 208 rather than a color filter and a black matrix may be formed on the color filter substrate 205.

In the first and second embodiments, it was explained that the present invention was applied to an amorphous silicon thin film transistor using an amorphous silicon thin film as an active pattern. However, the embodiments of the present invention are not limited to this. That is, the embodiments of the present invention may be also applied to a polycrystalline silicon thin film transistor using a polycrystalline silicon thin film as an active pattern, and an oxide thin film transistor using an oxide semiconductor device as an active layer.

The embodiments of the present invention may be applied not only to an LCD device, but also to other display devices fabricated by using thin film transistors, e.g., an OLED display device in which Organic Light Emitting Diodes (OLED) are connected to driving transistors.

The foregoing embodiments and advantages are simply examples and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the example embodiments described herein may be combined in various ways to obtain additional and/or alternative example embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A color filter using a surface plasmon, the color filter comprising:
   a metal layer; and
   a transmissive pattern formed in the metal layer, the transmissive pattern comprising a plurality of sub-wavelength holes having a period,
   wherein a desired color of light is output by selectively transmitting light of a specific wavelength by using the surface plasmon, and
   the plurality of sub-wavelength holes are arranged in a triangular lattice having a predetermined number of nearest neighboring holes with respect to a central hole.

2. The color filter of claim 1, wherein the central hole includes six neighboring holes having the same distance from the central hole of the transmissive pattern.

3. The color filter of claim 1, wherein a distance from the central hole of the transmissive pattern to a nearest neighboring hole is equal to a period, and a distance from the central hole to a next-nearest neighboring hole is about 1.732 times the period.

4. The color filter of claim 1, wherein a horizontal sectional surface of each of the plurality of sub-wavelength holes of the transmissive pattern has one of a circular shape, a quadrangular shape, a triangular shape, an oval shape, and a slit shape having an aspect ratio more than one.

5. The color filter of claim 1, wherein the metal layer is formed of a conductive material comprising at least one of aluminum (Al), gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

6. The color filter of claim 1, wherein each of the plurality of sub-wavelength holes of the transmissive pattern has a size of about 50 nm to 10 μm.

7. The color filter of claim 1, wherein each of the plurality of sub-wavelength holes of the transmissive pattern has a period of about 50 nm to 500 nm.

8. The color filter of claim 1, wherein the transmissive pattern is divided into a plurality of regions having different periods.

9. A liquid crystal display (LCD) device, comprising:
   a first substrate;
   a second substrate;
   a thin film transistor (TFT) formed on the first substrate, the TFT including a gate electrode, a semiconductor layer, a source electrode, and a drain electrode;
   a pixel electrode connected to the drain electrode on the first substrate;
   a common electrode formed on one of the first substrate and the second substrate; and
   a color filter formed on one of the first substrate and the second substrate, and having a transmissive pattern formed in a metal layer, the transmissive pattern comprising a plurality of sub-wavelength holes having a period, wherein a desired color of light is output by selectively transmitting light of a specific wavelength by using a surface plasmon, and the plurality of sub-wavelength holes are arranged in a triangular lattice having a predetermined number of nearest neighboring holes with respect to a central hole.

10. The LCD device of claim 9, wherein the color filter is formed on the first substrate.

11. The LCD device, of claim 9, wherein the color filter is formed on the second substrate.

12. The LCD device of claim 9, further comprising:
   an alignment layer on at least one of the first substrate and the second substrate; and
   liquid crystal and a spacer between the first substrate and the second substrate.

13. The LCD device of claim 9, wherein the central hole includes six neighboring holes having the same distance from the central hole of the transmissive pattern.

14. The LCD device of claim 9, wherein a distance from the central hole of the transmissive pattern to a nearest neighboring hole is equal to a period, and a distance from the central hole to a next-nearest neighboring hole is about 1.732 times the period.

15. The LCD device of claim 9, wherein a horizontal sectional surface of each of the plurality of sub-wavelength holes of the transmissive pattern has one of a circular shape, a quadrangular shape, a triangular shape, an oval shape, and a slit shape having an aspect ratio more than one.

16. The LCD device of claim 9, wherein the metal layer is formed of a conductive material comprising at least one of aluminum (Al), gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

17. The LCD device of claim 9, wherein each of the plurality of sub-wavelength holes of the transmissive pattern has a size of about 50 nm to 10 μm.

18. The LCD device of claim 9, wherein each of the plurality of sub-wavelength holes of the transmissive pattern has a period of about 50 nm to 500 nm.

19. The LCD device of claim 9, wherein the transmissive pattern is divided into a plurality of regions having different periods.

20. A liquid crystal display (LCD) device, comprising:
   a first substrate;
   a second substrate;
   a thin film transistor (TFT) formed on the first substrate, the TFT including a gate electrode, a semiconductor layer, a source electrode, and a drain electrode;
   a pixel electrode connected to the drain electrode on the first substrate;
   a color filter formed on the second substrate, and having a transmissive pattern formed in a metal layer, the transmissive pattern comprising a plurality of sub-wavelength holes having a period, wherein a desired color of light is output by selectively transmitting light of a specific wavelength by using a surface plasmon, and the plurality of sub-wavelength holes are arranged in a triangular lattice having a predetermined number of nearest neighboring holes with respect to a central hole; and
   liquid crystal disposed between the first substrate and the second substrate,
   wherein an electric field is generated between the pixel electrode on the first substrate and the color filter on the second substrate to drive the liquid crystal.

21. The LCD device of claim 20, wherein the color filter further functions as a common electrode to drive the liquid crystal with the pixel electrode.

22. The LCD device of claim 20, further comprising:
   an alignment layer on at least one of the first substrate and the second substrate; and
   liquid crystal and a spacer between the first substrate and the second substrate.

23. The LCD device of claim 20, wherein the central hole includes six neighboring holes having the same distance from the central hole of the transmissive pattern.

24. The LCD device of claim 20, wherein a distance from the central hole of the transmissive pattern to a nearest neighboring hole is equal to a period, and a distance from the central hole to a next-nearest neighboring hole is about 1.732 times the period.

25. A method for fabricating a liquid crystal display (LCD) device, the method comprising:
provideing a first substrate and second substrate;
forming a thin film transistor (TFT) on the first substrate, the TFT including a gate electrode, a semiconductor layer, a source electrode, and a drain electrode;
forming a pixel electrode connected to the drain electrode on the first substrate;
forming a common electrode on one of the first substrate and the second substrate;
forming a color filter on one of the first substrate and the second substrate, the color filter having a transmissive pattern formed in a metal layer, the transmissive pattern comprising a plurality of sub-wavelength holes having a period, wherein a desired color of light is output by selectively transmitting light of a specific wavelength by using surface plasmon, and the plurality of sub-wavelength holes are arranged in a triangular lattice having a predetermined number of nearest neighboring holes with respect to a central hole; and
bonding the first and second substrates to each other.

26. The method of claim 25, wherein the color filter is formed on the first substrate.

27. The method claim 25, wherein the color filter is formed on the second substrate.

28. The method claim 25, further comprising:
forming an alignment layer on at least one of the first substrate and the second substrate; and
providing liquid crystal and a spacer between the first substrate and the second substrate.

29. The method of claim 25, wherein the central hole includes six neighboring holes having the same distance from the central hole of the transmissive pattern.

30. The method claim 25, wherein a distance from the central hole of the transmissive pattern to a nearest neighboring hole is equal to a period, and a distance from the central hole to a next-nearest neighboring hole is about 1.732 times the period.

31. The method of claim 25, wherein a horizontal sectional surface of each of the plurality of sub-wavelength holes of the transmissive pattern has one of a circular shape, a quadrangular shape, a triangular shape, an oval shape, and a slit shape having an aspect ratio more than one.

32. The method of claim 25, wherein the metal layer is formed of a conductive material including at least one of aluminum (Al), gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

33. The method of claim 25, wherein each of the plurality of sub-wavelength holes of the transmissive pattern has a size of about 50 nm to 10 μm.

34. The method of claim 25, wherein each of the plurality of sub-wavelength holes of the transmissive pattern has a period of about 50 nm to 500 nm.

35. The method of claim 25, wherein the transmissive pattern is divided into a plurality of regions having different periods.

36. A method for fabricating a liquid crystal display (LCD) device, the method comprising:
providing a first substrate and a second substrate;
forming a thin film transistor (TFT) on the first substrate, the TFT including a gate electrode, a semiconductor layer, a source electrode, and a drain electrode;
forming a pixel electrode connected to the drain electrode on the first substrate;
forming a color filter on the second substrate, the color filter having a transmissive pattern formed in a metal layer, the transmissive pattern comprising a plurality of sub-wavelength holes having a period, wherein a desired color of light is output by selectively transmitting light of a specific wavelength by using the surface plasmon, and the plurality of sub-wavelength holes are arranged in a triangular lattice having a predetermined number of nearest neighboring holes with respect to a central hole;
forming an alignment layer and a spacer on at least one of the first substrate and the second substrate; and
providing a liquid crystal,
wherein an electric field is generated between the pixel electrode on the first substrate and the color filter on the second substrate to drive the liquid crystal.

37. The method of claim 36, wherein the color filter further functions as a common electrode to drive the liquid crystal with the pixel electrode.

38. The method of claim 36, wherein the central hole includes six neighboring holes having the same distance from the central hole of the transmissive pattern.

39. The method claim 36, wherein a distance from the central hole of the transmissive pattern to a nearest neighboring hole is equal to a period, and a distance from the central hole to a next-nearest neighboring hole is about 1.732 times the period.

* * * * *